United States Patent [19]

Pfeiffer

[11] 4,046,500

[45] Sept. 6, 1977

[54] PRESS SPAR FOR HEATED PANEL PRESS

[75] Inventor: Heinrich Pfeiffer, Eppingen, Germany

[73] Assignee: Maschinenfabrik J. Dieffenbacher & Co., Eppingen, Germany

[21] Appl. No.: 645,213

[22] Filed: Dec. 29, 1975

Related U.S. Application Data

[63] Continuation-in-part of Ser. No. 486,375, July 8, 1974, Pat. No. 3,998,580.

[30] Foreign Application Priority Data

Dec. 30, 1974 Germany ............................ 2431862

[51] Int. Cl.[2] .............................................. B29C 3/00

[52] U.S. Cl. ........................................ 425/407; 425/338; 425/384; 100/93 P

[58] Field of Search ............... 425/338, 384, 407, 472, 425/143, 520; 100/93 P; 264/109

[56] References Cited

U.S. PATENT DOCUMENTS

| | | | |
|---|---|---|---|
| 3,545,044 | 12/1970 | Rebovich et al. | 425/3 |
| 3,594,867 | 7/1971 | Pfeiffer | 425/143 |
| 3,685,932 | 7/1972 | Pfeiffer | 425/339 |
| 3,775,033 | 11/1973 | Pfeiffer | 425/520 |

*Primary Examiner*—Robert L. Spicer, Jr.
*Attorney, Agent, or Firm*—Joseph A. Geiger

[57] ABSTRACT

A press spar construction for a heated panel press producing chipboard panels and the like under elevated temperatures and pressures, the press spar structure having a thermal barrier arranged between each pressure plate and its supporting structure, the thermal barrier consisting of rows of insulating pressure blocks and spaced steel pressure blocks arranged between the insulating pressure blocks in the areas of maximum pressure concentration. The insulating pressure blocks are coated for imperviousness against humidity, and both types of blocks have metallic shrouds with anti-friction surface coatings. Shimming sheets are placed between the blocks and the shrouds, where necessary.

17 Claims, 5 Drawing Figures

THERMOSTAT CONTROLLED COOLING CIRCUIT MEANS
1
2
3
4
5
6
7
8
15
16

PRESS SPAR FOR HEATED PANEL PRESS

RELATED U.S. APPLICATION

This application is a continuation-in-part of my co-pending application Ser. No.486,375, filed July 8, 1974, now U.S. Pat. No. 3,998,580.

BACKGROUND OF THE INVENTION

1. Field of the Invention

The present invention relates to devices for the production of composite panels under the application of heat and pressure, and more particularly to heated panel presses for the production of chipboard panels, fiber panels, and the like, panel presses of this type being either single-layer or multi-layer presses and having a vertically movable press spar arranged above and opposite to a stationary press spar, both carrying heated pressure plates.

2. Description of the Prior Art

Large heated panel presses of the above-mentioned type are notorious for their problems encountered with respect to the maintenance of the required plane-parallelism of the heated pressure plates over a large number of pressing operations, as the pressure plates are alternatingly heated and cooled. The problems of heat distortion of the pressure plates are related to the fact that the latter are rather large in surface and have to be heated to an elevated temperature, so that a certain degree of uneven heat distribution within the structure of the supporting press spar is unavoidable. The latter leads to thermal stress and corresponding distortions of the pressure plate, with the result that the originally adjusted geometrically precise flatness of the pressure plates is soon lost.

Various approaches have been suggested in the past for a correction of this problem, one such proposal being that not only the pressure plates but also the supporting structure of the press spars should be heated, rather than only the pressure plates. Another approach suggests that the press spars should be cooled and that heat transfer barriers should be installed between the pressure plates and the supporting press spars, in order to prevent all heat transmission between them.

Known prior art panel presses which have such a heat transfer barrier are equipped with either a cooling grid and a special cooling plate, or an insulating layer against which the pressure plates are supported. This structure is subject to the shortcomings that a considerable number of machined surfaces are necessary, that corrosion is frequently encountered on these surfaces, and that the combined effects of cumulative machining tolerances, corrosion, and comparatively rapid local wear of the insulating layers amount to the end result that, even with a pressure plate machined to perfect flatness, no satisfactory pressing performance under maintenance of the necessary plane-parallelism over a substantial length of time is obtainable. The basic construction of such a press is disclosed, for example, in U.S. Pat. No. 3,594,867. Upper and lower press spars with insulated pressure plates are disclosed in U.S. Pat. Nos. 3,685,932 and 3,775,033.

One of the reasons for the above-mentioned problems is the tendency of the insulating layers to absorb humidity, thereby alternatingly swelling and contracting. The simultaneous expansion and contraction movements of the structural parts under the constant changes in temperature result in frictional displacements between the pressure plates and the insulating layers, so that the latter are subjected to rapid abrasion and premature destruction. Lastly, the pressure resistance and compressibility of the insulating layers was found to be changing as a function of the amount of humidity which has been absorbed by them.

The lack of dimensional stability of the insulating meterials and their inadequate long-term resistance to elevated temperatures and compression result in uneven wear and dimensional distortions of the insulating plates, so that the working surfaces of the pressure plates eventually become similarly distorted. The resultant work product is a composite pressed panel of uneven thickness, necessitating either reworking of the product, or complete rejection.

Other prior art solutions using the approach of compensatory heating or cooling of the entire press spar structure have the shortcoming that such a structure becomes very complex and costly, necessitating complicated temperature control devices. A further shortcoming of this aproach relates to the fact that a considerable amount of time is necessary for the initial heating of such a structure, until a state is reached in which all the component parts of the press spar have an even temperature.

In my co-pending application Ser. No. 486,375, filed July 8, 1974, is disclosed a solution to the above problem, the invention suggesting the arrangement of a thermal barrier between each pressure plate and a number of transversely extending, longitudinally spaced uprights of the press spar structure, the thermal barrier being constituted essentially of a row of insulating pressure blocks of high pressure resistance, low heat conductivity, and little or no humidity absorption. These insulating pressure blocks are confined between upper and lower metallic shrouds presenting wear-resistant outer displacement surfaces with an anti-friction layer to the pressure plate and the press spar uprights in the opposite direction.

In another embodiment of the above-mentioned prior invention is suggested the arrangement of a bottom plate between the press spar uprights and the thermal barrier which is welded to the uprights. This bottom plate has substantially the same horizontal extent as the pressure plates. Rows of shrouded insulating blocks, arranged in alignment with the uprights of the spar structure, and intermediate loose insulating pads constitute the heat barrier. The bottom plate may further have arranged in it a system of heat transfer channels, as part of a press spar heating and/or cooling system.

It has now been found that under extreme temperature and pressure conditions encountered over an extended period of time, the insulating pressure blocks of the prior invention may fail in their pressure resistance, with the result that the plane-parallelism of the pressure plates is lost. A product of diminished quality, due to uneven thickness, is the result.

SUMMARY OF THE INVENTION

Underlying the present invention is the objective of further improving the press spar structure suggested in my earlier application Ser. No. 486,375, by reinforcing the thermal barrier between the press spar structure and the pressure plates.

In order to attain this result, the present invention suggests that between the insulating pressure blocks of the prior invention be arranged, at the places of highest pressure, steel pressure blocks by means of which a major portion of the compressive forces on the press spar are transmitted to the pressure plate.

In a preferred embodiment of the present invention, these steel pressure blocks are arranged in a regular alternating pattern with one or several insulating pressure blocks. As in the case of the earlier-suggested insulating pressure blocks, it is further suggested that an anti-friction surface be provided on the steel pressure blocks, for a minimization of the frictional resistance and wear at the pressure contact surfaces.

The preferred embodiment of the invention still further suggests that each steel pressure block be equipped with a shroud on one side of it, which shroud may be similar to the shrouds suggested in connection with my earlier invention, the anti-friction layer being preferably applied to said shroud. Between the blocks and their shrouds may again be placed shimming sheets for a precise adjustment of the plane-parallelism on the pressure plates.

Particular advantages of the present invention relate to the fact that the thermal barrier between the pressure plate and the press spar structure not only reduces the overall energy requirements of the panel press, but also greatly shortens the warmup time required, by eliminating the previously necessary waiting time for the entire spar structure to reach an even temperature.

The suggested improved press spar structure with steel pressure blocks has the additional advantage of removing from the insulating pressure blocks a major portion of the compressive load, thereby greatly improving the longevity of these blocks. The use of spaced steel pressure blocks, though somewhat diminishing the effectiveness of the thermal barrier between the press spar structure and the pressure plate, guarantees reliable pressure transfer, free of any dimensional changes over the long term.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows.

DESCRIPTION OF THE PREFERRED EMBODIMENTS

Figures 1, 2, 3:
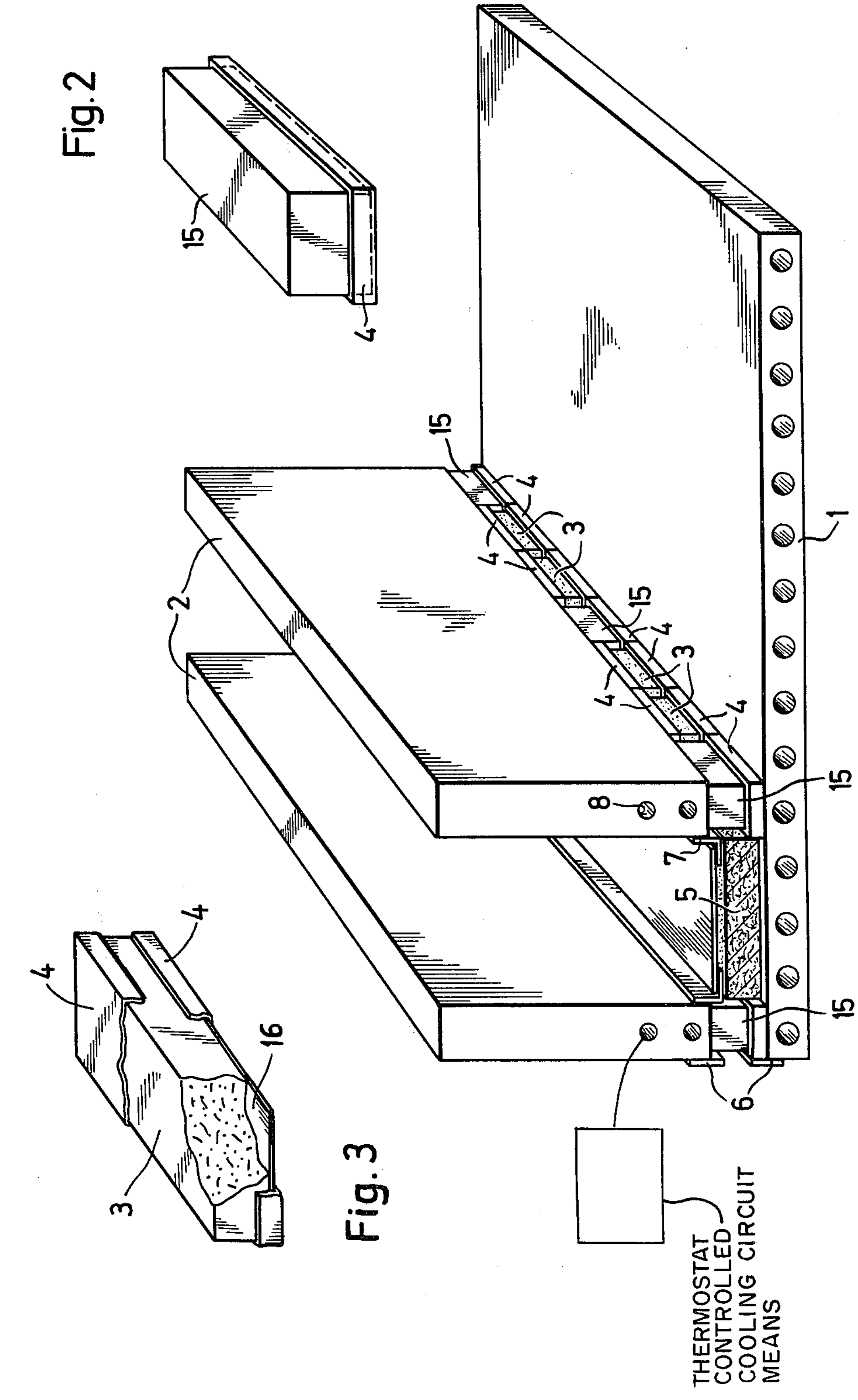
FIG. 1 is a perspective representation of a portion of an upper press spar of a heated panel press, incorporating an embodiment of the present invention.
FIG. 2 is an enlarged perspective view of a steel pressure block of the present invention.
FIG. 3 is an enlarged perspective view of an insulating pressure block of the present invention.

Referring to FIG. 1 of the drawing, there is shown a portion of an upper press spar of a heated panel press for the production of hot-pressed composite panels, such as chipboard panels, fiber panels, and the like. A similarly constructed lower press spar cooperates with the one illustrated in FIG. 1. Vertical displaceability is normally provided on the upper press spar. Of course, the lower, or both press spars, may likewise be made adjustable, if desired. The two press spars carry opposing horizontal pressure plates, like the pressure plate 1 of the upper press spar shown in FIG. 1. The supporting press spar structure to which the pressure plate 1 is attached includes several transversely oriented longitudinally spaced uprights 2, the pressure plate 1 being connected to the uprights 2 with attachments permitting corrective horizontal displacements between the pressure plate 1 and press spar structure. Since the general structure of such a press spar is generally known, no additional constructional details are shown in the drawing. Such details are given, for example in U.S. Pat. Nos. 3,594,867, 3,685,932, and 3,775,033.

Between the pressure plate 1 and the downwardly oriented end face of each upright 2 is arranged a row of pressure blocks of either steel or a special pressure resistant insulating material. The arrangement of FIG. 1 features three transversely spaced steel pressure blocks 15 and arranged between them two pairs of insulating pressure blocks 3. For panel press applications using reduced pressures, the entire row of pressure blocks may consist of insulating pressure blocks, as disclosed in my co-pending application Ser. No. 486,375, filed July 8, 1974.

Each insulating pressure block 3 is protected by an upper and lower metallic shroud 4, the steel pressure blocks having only one metallic shroud 4 which is arranged on that side of the block which engages the pressure plate 1. An assembled steel pressure block is shown in FIG. 2 and an insulating block is shown in FIG. 3.

Since relative horizontal motions between the hot pressure plate 1 and the much cooler uprights 2 are inevitable, and since these motions take place at the interfaces with the pressure blocks 3 and 15, the invention provides that at least the lower shrouds 4 be coated on the outside with an anti-friction coating such as a coating of polytetrafluoro-ethylene (PTFE). Normally, it is desirable to have a higher coefficient of friction on the inside of the metallic shrouds 4 than on the outside, especially between the insulating pressure blocks 3 and their shrouds 4, in order to prevent any frictional displacements and the consequent wear on the insulating blocks themselves.

The material of the insulating blocks is a material having high pressure resistance and a low heat conductivity, combined with a minimal water absorption tendency. Such materials are, for example, mica compositions, ceramics, glass, natural or synthetic stone, and asbestos. The latter, however, require special impregnation or surface coating, in order to render them impervious to water and especially to steam. The physical characteristics of these materials fall within the following ranges:

Heat conductivity: 0.65 to 2.2 KCal/meter, h, ° C
Compression resistance: 1000 to 8500 kp/cm$^2$
Water absorption: 0.00
Long-term heat resistance: 400° to 500° C The insulating blocks are preferably made impervious to humidity through a plastic or metallic coating applied to all surfaces, thereby eliminating any risk of swelling due to humidity absorption. A suitable coating material is PTFE, which has the additional advantage of producing an extremely smooth surface with a low coefficient of friction. If a metallic skin is applied to the insulating blocks, such materials as steel, bronze, or other coatable metals may be spray-coated onto the insulating blocks.

The machined pressure plate 1, when mounted on the press spar uprights 2, though machined perfectly flat, may still show certain small deviations from a geometrically precisely flat pressure surface, due to the cumulation of tolerances on the various cooperating parts, especially the insulating pressure blocks 3 and the steel pressure blocks 15 with their shrouds 4. The use of at least one shroud 4 in connection with each pressure block now offers a convenient possibility of compensating for small dimensional deviations due to manufacturing and assembly tolerances. This is accomplished by inserting between the metallic shrouds 4 and the enclosed pressure blocks 3 or 15 suitable shimming sheets 16 of appropriate gauge. One or more such shimming sheets 16 may be positioned inside a shroud 4, the upstanding edges of the shrouds serving as a convenient positioning means for the shimming sheets. Shimming adjustments at increments of one tenth of a millimeter, or less, are thus possible at virtually any point of pressure transfer between the press spar structure and the pressure plate 1, with the result that the latter can be mounted with geometrically true plane parallelism.

In those cases where the heated panel press operates at very high pressing temperatures, and where a risk exists that the press spar structure opposite the pressure blocks is heated more than can be tolerated, the invention further suggests that the uprights 2 of the press spar structure be provided with heat transfer channels 8 which extend longitudinally through the uprights, for the circulation therethrough of a suitable cooling fluid. Where such a cooling system is required, the invention further suggests that the rate at which the cooling fluid is circulated and/or its temperature be made adjustable, and that appropriate circulation control means, responsive to temperature sensors arranged in the press spar structure opposite the heated pressure plates, be provided. Such an arrangement precludes any undesirable heat buildup in the press spar structure through heat transmission from the pressure plates. The press spar uprights 2 are preferably maintained at a temperature which is close to the ambient temperature. Examples of cooling systems for this purpose are given in U.S. Pat. No. 3,594,867 or U.S. Pat. No. 3,775,033.

As FIG. 1 shows, the steel pressure blocks 15 and the insulating pressure blocks 3 are directly adjoining each other in the transverse sense of the uprights 2 and are held in place underneath the latter by means of angle irons 7 and, in the case of the first and last upright, by end battens 6. Between the rows of pressure blocks are arranged insulating pads 5 of less expensive insulating materials, such as glass wool, stone wool, or the like.

Figure 4:
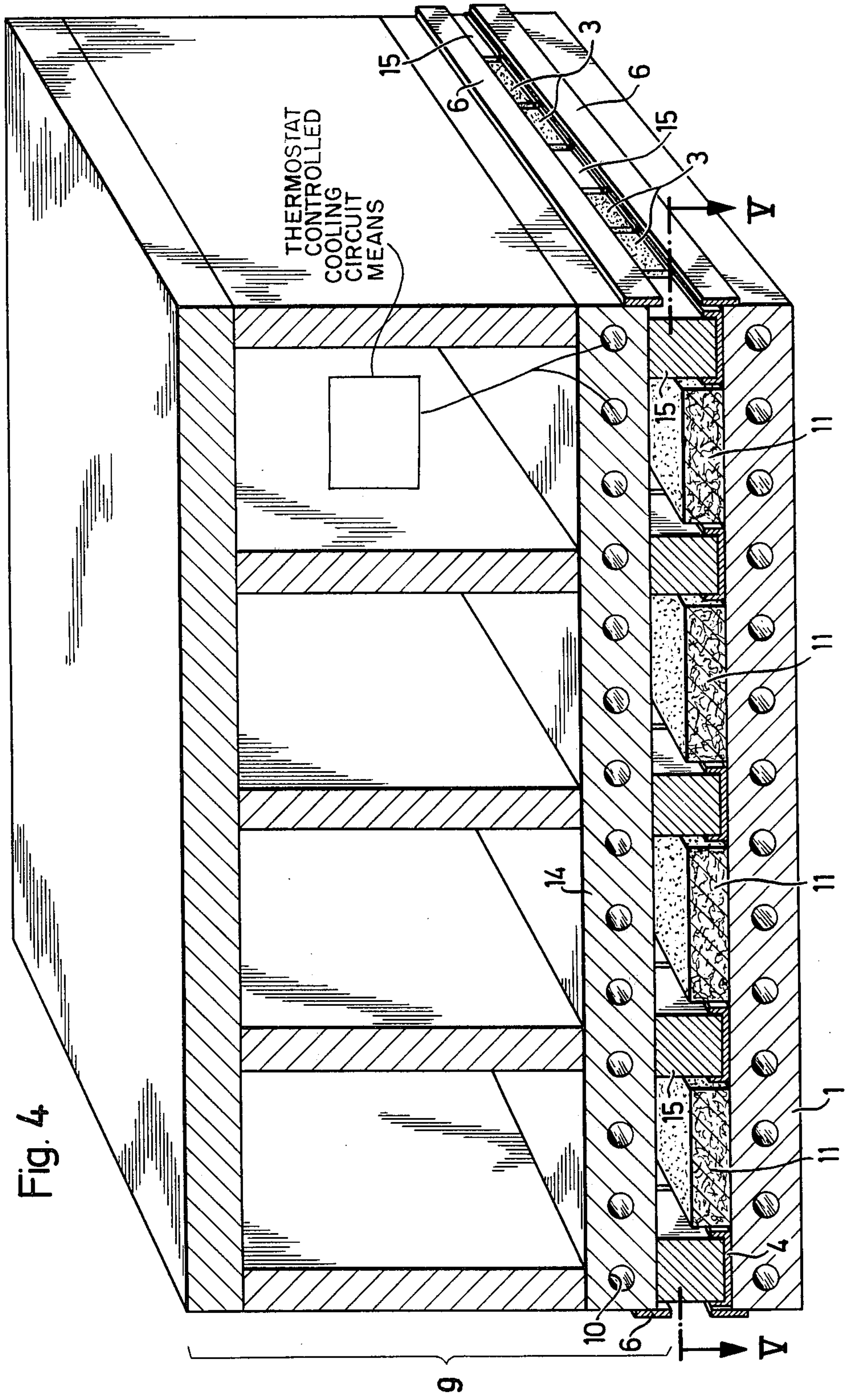
FIG. 4 is a perspective representation of a second embodiment of the invention, featuring a bottom plate and a thermal barrier assembly covering the entire surface of the pressure plate.
Figure 5:
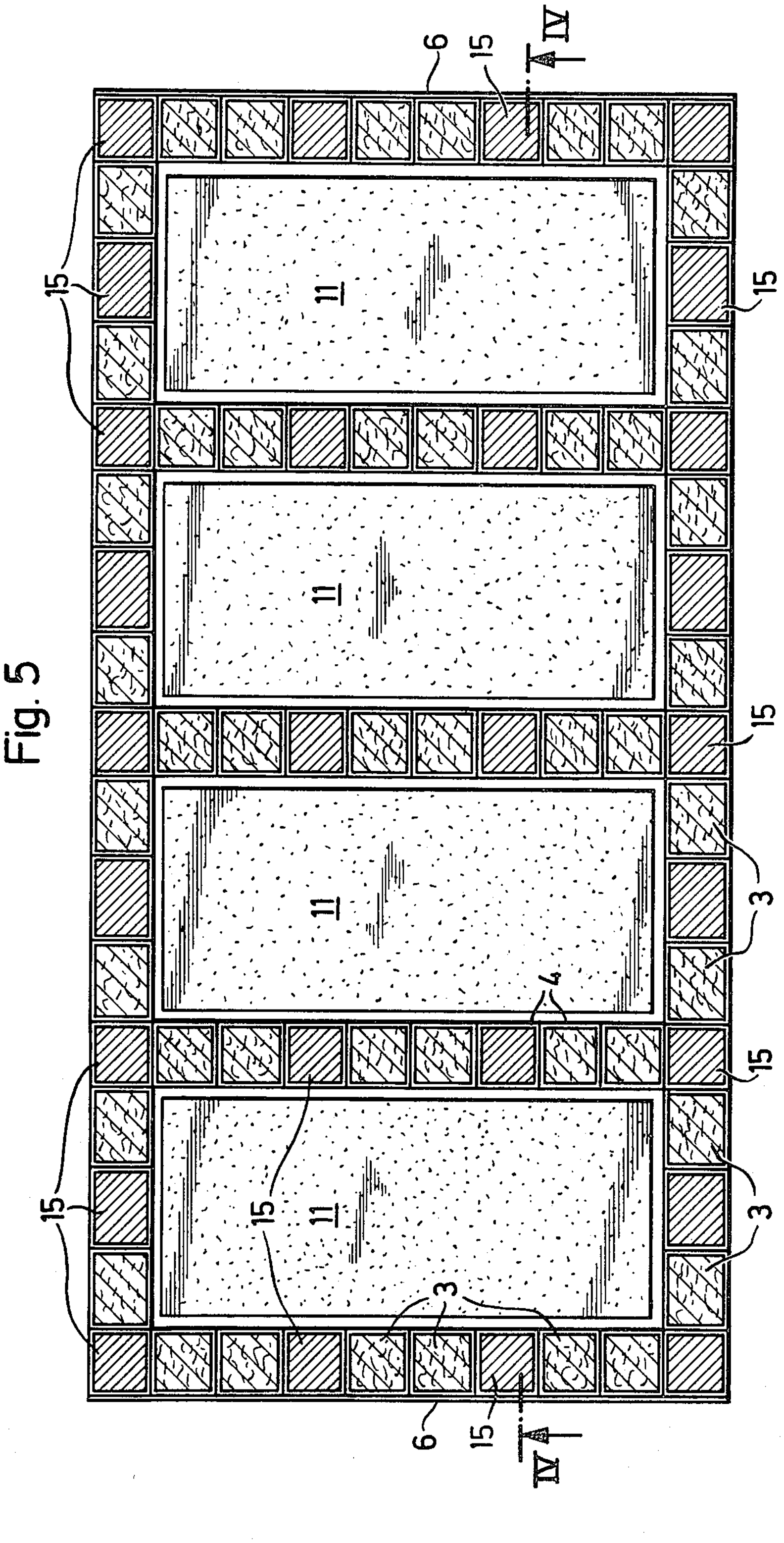
FIG. 5 shows in a plane view the arrangement of the thermal barrier assembly of the embodiment of FIG. 4.

In FIGS. 4 and 5 is illustrated a second embodiment of the invention in which a bottom plate 14 is arranged vertically between the uprights 2 of the press spar structure and the thermal barrier which separates the press spar structure from the pressure plate 1. The thermal barrier consists again of rows of insulating pressure blocks 3 alternating with steel pressure blocks 15 at the places of highest pressure concentration. This pattern is shown in FIG. 5, where two insulating pressure blocks 3 alternate with one steel pressure block 15 in the transverse rows underneath the press spar uprights 2, and single insulating pressure blocks alternate on the longitudinal sides of the structure. Insulating pads 11 of less expensive material, such as stone wool, glass wool, or asbestos cement, are again arranged in the intermediate spaces between the several rows of pressure blocks. These intermediate insulating pads 11 may serve as longitudinal spacers for the several rows of pressure blocks, while end battens 6 are again arranged on the two longitudinal extremities of the structure.

Like in the earlier-described embodiment, cooling means may again be provided in the press spar structure, if necessary. In such a case, the bottom plate 14 lends itself conveniently for connection to a cooling system which circulates a cooling medium through its heat transfer channels 10. Again, the cooling system itself is known and is therefore not shown in FIG. 4, for the sake of clarity of the drawing.

Any deviations of the pressure plate 1 from the geometrically true flat surface can again be conveniently compensated for by the interposition of one or more shimming sheets 16 between the insulating pressure blocks 3 and their top or bottom shrouds 4 (FIG. 3) and/or between the steel pressure blocks 15 and their bottom shrouds 4 (FIG. 2).

It should be understood, of course, that the foregoing disclosure describes only preferred embodiments of the invention and that it is intended to cover all changes and modifications of these examples of the invention which fall within the scope of the appended claims.

I claim:

1. In a heated panel press for the production of pressed, composite panels such as chipboard panels, fiber panels and the like, in which the work is pressed between opposing, heatable and coolable horizontal pressure plates mounted on upper and lower press spars, respectively, of which at least one is vertically movable, a press spar structure comprising in combination:

at least two upright press spar members to which the associated horizontal pressure plates are operatively connected;

a heat barrier in the form of a pressure resistant insulating bank interposed between the back surface of each pressure plate and a pressure transmitting end face of the associated upright press spar member; and at least one metallic shroud member encasing the insulating bank where it engages the pressure plate, so that relative horizontal displacements between the upright member and its pressure plate which are generated during operation take place between said shroud members and the pressure plate; and wherein each insulating bank includes a succession of insulating pressure blocks and at least one steel pressure block interposed between insulating pressure blocks, for the transmission of elevated pressures between the pressure plate and the press spar structure.

2. A press spar structure as defined in claim 1, wherein the insulating pressure blocks have upper and lower metallic shroud members;

the metallic shroud members are separate shrouds encasing the top and bottom sides of each insulating pressure block;

the insulating pressure blocks are of a material selected for high pressure resistance, low heat conductivity, and minimal humidity absorption; and the steel pressure blocks have similar shrouds encasing their bottom sides.

3. A press spar structure as defined in claim 2, wheein the insulating pressure blocks are of a material selected from the group consisting of mica compositions, glass and ceramics.

4. A press spar structure as defined in claim 2, wherein:
the insulating pressure blocks are of a material selected from the group consisting of natural stone, synthetic stone, and asbestos; and
the insulating pressure blocks are treated so as to be impervious to humidity and steam.

5. A press spar structure as defined in claim 2, wherein:
the outer contact surfaces of the bottom shrouds of both types of pressure blocks have an anti-friction surface coating applied thereto; and
the coefficient of friction obtaining under pressure between the insulating pressure blocks and the inner faces of their bottom shrouds is considerably higher than the coefficient of friction obtaining between said coated outer contact surfaces of the shrouds and the cooperating member of the press spar structure.

6. A press spar structure as defined in claim 2, wherein
the insulating pressure blocks have a surface coating on at least their top and bottom surfaces.

7. A press spar structure as defined in claim 6, wherein
the surface coating of the insulating pressure blocks is a heat-resistant synthetic plastic material.

8. A press spar structure as defined in claim 7, wherein
the material of the surface coating of the insulating pressure blocks is polytetrafluoro-ethylene.

9. A press spar structure as defined in claim 6, wherein
the surface coating of the insulating pressure blocks is a metallic skin.

10. A press spar structure as defined in claim 2, further comprising
a bottom plate of a size matching that of the pressure plate and arranged contiguously with the pressure transmitting end faces of the upright members, between the latter and the insulating banks; and wherein
the insulating banks together define a flat insulating frame having an outline likewise matching that of the pressure plate and including at least one transverse web portion; and
the insulating frame further includes insulating pads arranged in the spaces between the transverse web portions and the peripheral portions of the frame.

11. A press spar structure as defined in claim 10, wherein
the bottom plate is attached to the end faces of the upright members;
the upright members are several longitudinally spaced uprights having a transverse length substantially equal to the width of the pressure plate; and
the transverse web portions of the insulating frame are arranged in vertical alignment with the longitudinal positions of the uprights.

12. A press spar structure as defined in claim 10, wherein
the bottom plate includes cooling channels extending therethrough; and
the press spar structure further comprises means for circulating a cooling medium through said cooling channels.

13. A press spar structure as defined in claim 1, further comprising
means for cooling those portions of the press spar structure which are proximate to the insulating frame.

14. A press spar structure as defined in claim 13, wherein
the cooling means includes cooling channels arranged in the press spar structure adjacent the insulating frame, means for circulating a cooling medium therethrough, and means for thermostatically adjusting the rate of cooling so as to maintain an even temperature in the press spar structure, inspite of varying heat levels in the pressure plate.

15. A press spar structure as defined in claim 1, further comprising
shimming sheets interposed between the insulating banks and their shroud members, for the compensation of any deviations from plane-parallelism between the work-pressing surfaces of the opposing pressure plates.

16. A press spar structure as defined in claim 15, wherein
each insulating bank includes a series of adjacently positioned rectangular pressure blocks, some being of the insulating type, others being of the steel type;
the metallic shroud members are separate shrouds encasing the top and bottom sides of each insulating pressure block and the bottom side of each steel pressure block, each shroud having a rectangular bottom portion and four upstanding side portions; and
the shimming sheets are sized to fit between the insulating pressure block and one of the shrouds, being laterally confined between its upstanding side portions.

17. A press spar structure as defined in claim 5, wherein
said anti-friction surface coating is a layer of polytetrofluoro-ethylene.

* * * * *